(Model.)
W. SMITH.
Machine for Sowing Seed.
No. 236,188. Patented Jan. 4, 1881.
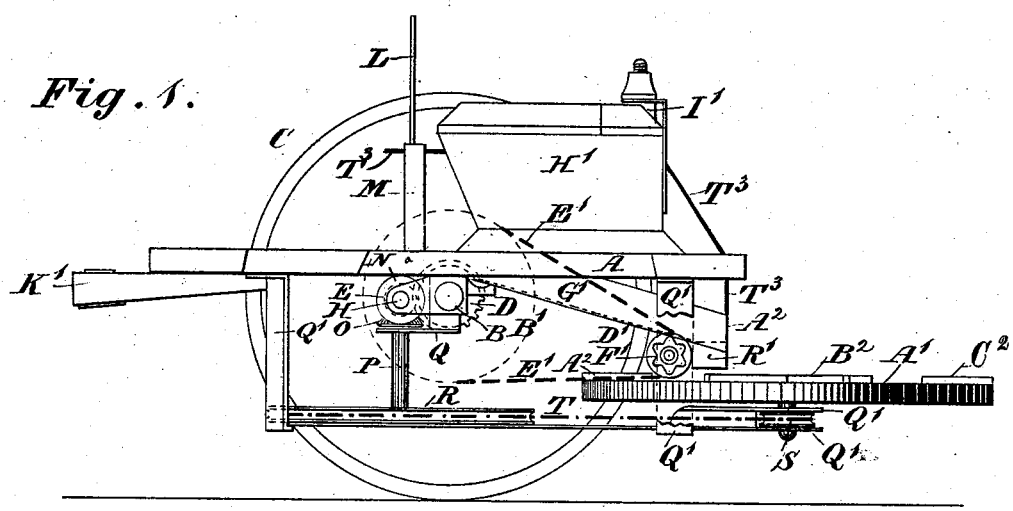
Fig. 1.
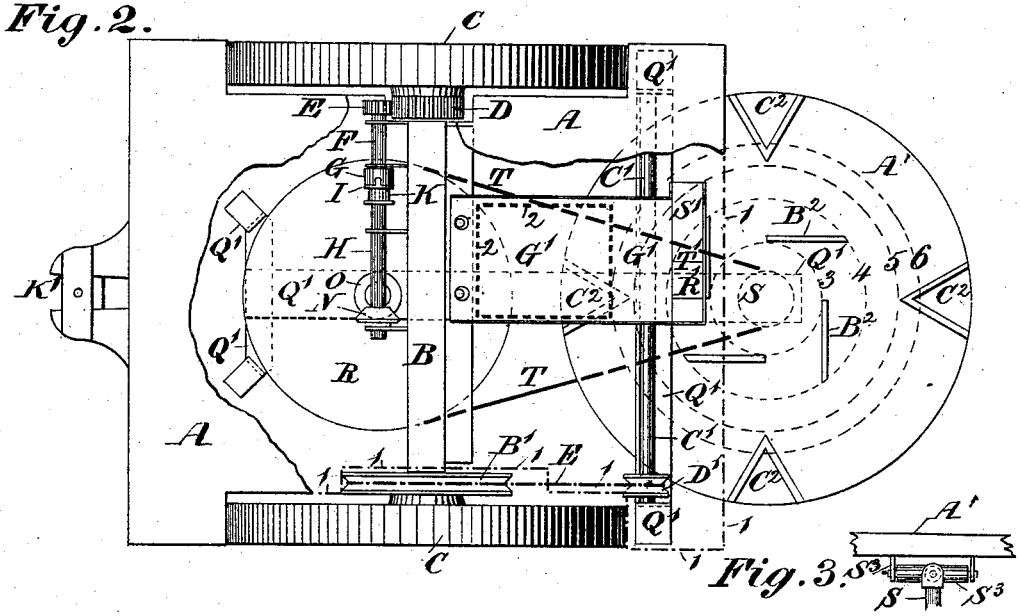
Fig. 2.
Fig. 3.
Witnesses
Charles G. Simpson
H. Irwin.
Inventor
William Smith

UNITED STATES PATENT OFFICE.

WILLIAM SMITH, OF MONTREAL, QUEBEC, CANADA.

MACHINE FOR SOWING SEED.

SPECIFICATION forming part of Letters Patent No. 236,188, dated January 4, 1881.

Application filed October 21, 1880. (Model.)

*To all whom it may concern:*

Be it known that I, WILLIAM SMITH, of the city and district of Montreal, Province of Quebec, Canada, have invented certain new and useful Improvements in Machines for Distributing Seed, Fertilizers, &c.; and I do hereby declare that the following is a full, clear, and exact description of the same.

This invention has reference to a machine for distributing or sowing seeds broadcast, and may also be used for lime, manure, and all similar substances or articles.

In the drawings hereunto annexed similar letters and numerals of reference indicate like parts, and Figure 1 is a side elevation of a machine embodying my invention. Fig. 2 is a plan of Fig. 1 with platform nearly all removed, but the outline of parts removed of said platform is indicated by chain-lines marked 1. Fig. 3 is a detail of modified attachment of disk.

Letter A is the platform of the machine, to which is secured the non-revolving axle B, upon which are placed the ordinary wheels C.

To the hub of one wheel is secured a gear-wheel, D, intermeshing with a pinion, E, secured on a shaft, F, carried in any ordinary bearing, as shown, attached to the axle. F is provided with a clutch-block.

H is a shaft situated in continuation of the line of F, similarly carried by brackets attached on the axle, and provided with a clutch, I.

L is a lever (see Fig. 1) having a forked end to straddle the center part, K, of the clutch I, and operate it by a device so common that the mere mention of it is sufficient.

M is a guard for the lever L, with notches for securing it in the two positions required for holding the clutch I in. By this means the shaft H will be caused to revolve when the wheels C revolve, or not, as desired, by simply engaging or disengaging the clutch.

N is a beveled wheel secured on H, intermeshing with a beveled wheel, O, secured on the upright shaft P, which is carried at the top by a bracket, Q, attached to a supplementary portion of the body of the axle B, or, if the axle is large enough, it may be attached to the axle, and at the bottom by an under frame-work, Q'. On P is secured a large driving-pulley, R, so that when the shaft H is revolved the pulley R also revolves. In the rear end of the under frame-work, Q', is carried a revolving pulley and shaft, S, driven by a band, &c., T, passing over it and the pulley R. On the top of the spindle and pulley S is secured a disk, A'. Therefore from the above it will be seen that by engaging and disengaging the clutch I the disk A' will be caused to revolve at very great speed, or not, as the wheel C, with which it is connected, revolves. On the hub of the other wheel C is secured a pulley, B'.

I would here remark that in Fig. 1 this wheel is not represented, because to do so would hide the working parts and confuse the figure; but the position of the pulley B' is indicated by a dotted line, B'.

In the two rear uprights of the under frame-work, Q', is carried a shaft, C', on which is secured a pulley, D', and, by a band, &c., E', passing over it and the pulley B', the shaft C' is caused to revolve at all times when the wheel C, with which it is connected, revolves. On the shaft C' an ordinary cam, F', is situated at about the center, under the chute G', for the purpose of imparting to it a tremulous motion.

H' is a hopper having an ordinary regulating gate, I', and arranged to have its bottom opening fall within the chute, as indicated by a rectangular figure formed of short thick dotted lines 2 in Fig. 2.

K' is any ordinary means for attaching the shafts or draft-pole, as the case may be.

I will now describe more particularly the chute G' and disk A'.

The chute G' consists of a grand incline from front to rear, which terminates at two transverse minor inclines, R' and S', which deliver the seed, &c., onto the disk A'. The one R' is arranged to deliver the seed, &c., passing down it in the annulus represented by the dotted circles 3 and 4, while the incline S' is arranged to deliver the seed passing down it on an annulus represented by the dotted circles 5 and 6.

The line T' represents the summit of the two minor inclines, and this summit should be placed in the center of the incline G', so that there may be an equal amount of seed, &c., delivered upon each minor incline R' and S'.

$A^2$ is a guard at rear side of R' and S', to prevent the seed, &c., from falling over and not fairly rolling down the two said minor inclines.

On the disk A' are secured or formed four projections, B², situated at equal distances, each forming a tangent to the circle 3, and each terminated by the circle 4.

C² are angular pieces secured on the disk A', having the vertex of the angle brought to about the circle 5. Now, the seed, &c., falling from the minor incline R', being delivered near the center, remains longer upon the disk A', and is scattered by the centrifugal force imparted to it by the table and projections B² C², on the left side of the machine, (or lower side of Fig. 2,) while that falling from the minor incline S', coming at once in contact with the projections C², is scattered on the right side of the machine.

In Fig. 3 is shown a modification of the attachment of the disk A' to the spindle and pulley S. S³ is a universal joint interposed, as shown, between them, so that when the disk is revolving with speed it will, by its centrifugal action, always keep itself horizontal, although the machine meets with many unevennesses of surface of land over which it travels.

T³ is a cord attached to A², so that G', R', and S' may be raised at any time, and G' thus pressed up against the gate I', preventing any further flow of seed. The end of T³ is brought forward to be near the hand of the driver, and may be secured on his seat, which will be situated about the front of platform A, so that when turning round at each end of the field the seed, &c., may not be wasted.

I have before shown how that the disk A' may be put in motion from the wheel or not, as desired, so that when traveling on the road, &c., the disk A' not requiring to be used, power need not be uselessly consumed in revolving it.

I have not shown the seat of the driver, because it may be of any ordinary form.

The use of a revolving horizontal disk is not new, as will be seen from the patents of the United States Nos. 111,992 and 122,405, and others.

What I claim, and wish to secure by Letters Patent, is as follows:

1. The combination, in a distributing-machine, of a horizontal revolving disk, A', having projections B² and C², as described, with minor inclines R' and S', substantially as and for the purposes set forth.

2. The combination of the hopper H', chute G', minor inclines R' and S', disk A', having projections B² and C², the whole substantially as and for the purposes set forth.

WILLIAM SMITH.

Witnesses:
CHARLES G. C. SIMPSON,
A. IRWIN.